(12) United States Patent
DeJana et al.

(10) Patent No.: US 9,229,784 B2
(45) Date of Patent: Jan. 5, 2016

(54) DETERMINING RESOURCE INSTANCE PLACEMENT IN A NETWORKED COMPUTING ENVIRONMENT

(75) Inventors: Ryan G. DeJana, Longmont, CO (US); Lisa Seacat DeLuca, San Francisco, CA (US); Soobaek Jang, Hamden, CT (US); Daniel C. Krook, Fairfield, CT (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 13/238,373

(22) Filed: Sep. 21, 2011

(65) Prior Publication Data

US 2013/0073716 A1 Mar. 21, 2013

(51) Int. Cl.
*G06F 9/50* (2006.01)

(52) U.S. Cl.
CPC ........ *G06F 9/5077* (2013.01); *G06F 2209/501* (2013.01); *G06F 2209/502* (2013.01)

(58) Field of Classification Search
None
See application file for complete search history.

(56) References Cited

U.S. PATENT DOCUMENTS

| 8,086,544 B2* | 12/2011 | Boss et al. | 705/400 |
| 8,260,921 B2* | 9/2012 | Uyama et al. | 709/226 |
| 8,346,921 B1* | 1/2013 | Goodspeed et al. | 709/224 |
| 8,631,099 B2* | 1/2014 | Morgan | 709/220 |
| 2004/0260813 A1* | 12/2004 | Heisserman | G06Q 10/04 709/226 |
| 2005/0021739 A1* | 1/2005 | Carter et al. | 709/224 |
| 2010/0057935 A1* | 3/2010 | Kawai et al. | 709/241 |
| 2010/0076951 A1 | 3/2010 | Lyle et al. | |
| 2010/0235431 A1 | 9/2010 | Poluri et al. | |
| 2010/0318658 A1 | 12/2010 | Zorn et al. | |
| 2011/0035078 A1* | 2/2011 | Jackson | 700/300 |
| 2011/0119104 A1* | 5/2011 | Levine et al. | 705/7.25 |
| 2011/0119370 A1* | 5/2011 | Huang et al. | 709/224 |

(Continued)

OTHER PUBLICATIONS

'Identification of a company's suitability for the adoption of cloud computing and modelling its corresponding Return on Investment', by Subhas Chandra Misra, Arka Mondal, Mathematical and Computer Modelling, Science Direct Elsevier Journal, Mar. 16, 2010.*

(Continued)

*Primary Examiner* — Greg C Bengzon
(74) *Attorney, Agent, or Firm* — Noah A. Sharkan; Hunter E. Webb; Keohane & D'Alessandro PLLC

(57) ABSTRACT

Embodiments of the present invention provide an approach for provisioning a virtual resource instance (e.g., a server instance, etc.) in a networked computing environment (e.g., a cloud computing environment) based upon network characteristics (e.g., physical locations, email addresses/configurations, network connection types, internet protocol (IP) addresses, etc.) of a set (at least one) of intended end users of the virtual resource instance. Specifically, in a typical embodiment, the network characteristics associated with the set of intended end users will be gathered and analyzed (e.g., to determine end user location, etc.). The analysis of the network characteristics will then be used to calculate/determine relative (e.g., network) efficiency scores for each intended end user for a set of potential data centers for the virtual resource instance. The relative efficiency scores for each potential data center will be summed/totaled to yield a total (e.g., network) efficiency score for each potential data center. Thereafter, the particular data center with the highest/best total efficiency score may be selected, and the requested resource instance may be provisioned at that data center.

22 Claims, 6 Drawing Sheets

(56) References Cited

U.S. PATENT DOCUMENTS

| | | | |
|---|---|---|---|
| 2011/0138048 A1 | 6/2011 | Dawson et al. | |
| 2011/0138050 A1 | 6/2011 | Dawson et al. | |
| 2011/0159876 A1* | 6/2011 | Segall | H04W 64/00 455/442 |
| 2012/0005685 A1* | 1/2012 | Chen et al. | 718/104 |
| 2012/0124211 A1* | 5/2012 | Kampas et al. | 709/226 |
| 2012/0131176 A1* | 5/2012 | Ferris et al. | 709/224 |
| 2012/0137002 A1* | 5/2012 | Ferris et al. | 709/226 |
| 2012/0142360 A1* | 6/2012 | Puthenpura | H04L 41/145 455/446 |
| 2012/0151057 A1* | 6/2012 | Paredes | H04L 12/4641 709/225 |
| 2012/0266159 A1* | 10/2012 | Risbood et al. | 717/177 |
| 2012/0278903 A1* | 11/2012 | Pugh | 726/28 |
| 2012/0303740 A1* | 11/2012 | Ferris | 709/217 |
| 2012/0311154 A1* | 12/2012 | Morgan | 709/226 |
| 2012/0324259 A1* | 12/2012 | Aasheim et al. | 713/320 |
| 2013/0212282 A1* | 8/2013 | Pulier et al. | 709/226 |
| 2013/0311551 A1* | 11/2013 | Thibeault | 709/203 |

OTHER PUBLICATIONS

'Secure virtualization for cloud computing ', Flavio Lombardi, RobertoDiPietro, Mathematical and Computer Modelling, Science Direct Elsevier Journal, Jun. 22, 2010.*

Maitland, J., "Keeping Control Isn't Easy", Chapter 4: Cloud-Based Infrastructure, SearchCloudComputing.com, 13 pages.

Mell et al., "The NIST Definition of Cloud Computing", National Institute of Standards and Technology, Information Technology Laboratory, Version 15, Oct. 7, 2009, 2 pages.

Lee, Y. et al., "Research Proposal for Cross Stratum Optimization (CSO) between Data Centers and Networks", Network Working Group informational Internet Draft dated Mar. 3, 2011, 17 pages. http://tools.ietf.org/html/draft-lee-cross-stratum-optimization-datacenter-00.

"Increasing Revenue Through Continuously Optimized Data Center Management", Copyright 2011 Deopli Corporation, 9 pages. No authors cited. www.deopli.com.

Maitland, J., "Keeping Control Isn't Easy", Chapter 4: Cloud-Based Infrastructure, SearchCloudComputing.com, Publication Date: Oct. 2009, 17 pages.

* cited by examiner

DETERMINING RESOURCE INSTANCE PLACEMENT IN A NETWORKED COMPUTING ENVIRONMENT

TECHNICAL FIELD

In general, the present invention relates to resource instance placement in a networked computing environment (e.g., a cloud computing environment). Specifically, the present invention relates to the determining of locations to place resource instances based upon network characteristics of intended end users.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

When provisioning resource instances in networked computing environment (e.g., a cloud computing environment), an end user often has a choice where a running instance may be located (e.g., such as in a data center in the western United States, northeastern United States, etc.). However, challenges may exist in that an optimal location for a resource instance (e.g., based on its intended users) may not be known at the time the request is made by a requesting user. Moreover, it is often difficult to move an instance once it has been provisioned and is actively accessed by end users.

SUMMARY

In general, embodiments of the present invention provide an approach for provisioning a virtual resource instance (e.g., a server instance, etc.) in a networked computing environment (e.g., a cloud computing environment) based upon network characteristics (e.g., physical locations, email addresses/configurations, network connection types, internet protocol (IP) addresses, etc.) of a set (at least one) of intended end users of the virtual resource instance. Specifically, in a typical embodiment, the network characteristics associated with the set of intended end users will be gathered and analyzed (e.g., to determine end user location, etc.). The analysis of the network characteristics will then be used to calculate/determine relative (e.g., network) efficiency scores for each intended end user for a set of potential data centers for the virtual resource instance. The relative efficiency scores for each potential data center will be summed/totaled to yield a total (e.g., network) efficiency score for each potential data center. Thereafter, the particular data center with the highest/best total efficiency score may be selected, and the requested resource instance may be provisioned at that data center.

A first aspect of the present invention provides a computer-implemented method for determining one or more locations to place virtual resource instances in a networked computing environment, comprising: receiving a request for a virtual resource instance on a computer memory medium in the networked computing environment, the request being associated with a set of network characteristics for a set of intended end users of the virtual resource instance; analyzing the set of network characteristics for each of the set of intended end users; calculating a relative efficiency score for each of the set of intended end users based on the network characteristics and a set of potential data centers in which the virtual resource instance can be provisioned; calculating a total efficiency score for each of the set of potential data centers based on the relative efficiency scores; selecting a particular data center from the set of potential data centers based on the total efficiency scores; and provisioning the virtual resource instance in the particular data center.

A second aspect of the present invention provides a system for determining one or more locations to place virtual resource instances in a networked computing environment, comprising: a memory medium comprising instructions; a bus coupled to the memory medium; and a processor coupled to the bus that when executing the instructions causes the system to: receive a request for a virtual resource instance on a computer memory medium in the networked computing environment, the request being associated with a set of network characteristics for a set of intended end users of the virtual resource instance; analyze the set of network characteristics for each of the set of intended end users; calculate a relative efficiency score for each of the set of intended end users based on the network characteristics and a set of potential data centers in which the virtual resource instance can be provisioned; calculate a total efficiency score for each of the set of potential data centers based on the relative efficiency scores; select a particular data center from the set of potential data centers based on the total efficiency scores; and provision the virtual resource instance in the particular data center.

A third aspect of the present invention provides a computer program product for determining one or more locations to place virtual resource instances in a networked computing environment, the computer program product comprising a computer readable storage media, and program instructions stored on the computer readable storage media, to: receive a request for a virtual resource instance on a computer memory medium in the networked computing environment, the request being associated with a set of network characteristics for a set of intended end users of the virtual resource instance; analyze the set of network characteristics for each of the set of intended end users; calculate a relative efficiency score for each of the set of intended end users based on the network characteristics and a set of potential data centers in which the virtual resource instance can be provisioned; calculate a total efficiency score for each of the set of potential data centers based on the relative efficiency scores; select a particular data center from the set of potential data centers based on the total efficiency scores; and provision the virtual resource instance in the particular data center.

A fourth aspect of the present invention provides a method for deploying a system for determining one or more locations to place virtual resource instances in a networked computing environment, comprising: providing a computer infrastructure being operable to: receive a request for a virtual resource instance on a computer memory medium in the networked computing environment, the request being associated with a set of network characteristics for a set of intended end users of the virtual resource instance; analyze the set of network characteristics for each of the set of intended end users; calculate a relative efficiency score for each of the set of intended end users based on the network characteristics and a set of potential data centers in which the virtual resource instance can be provisioned; calculate a total efficiency score for each of the set of potential data centers based on the relative efficiency scores; select a particular data center from the set of potential data centers based on the total efficiency scores; and provision the virtual resource instance in the particular data center.

BRIEF DESCRIPTION OF THE DRAWINGS

These and other features of this invention will be more readily understood from the following detailed description of the various aspects of the invention taken in conjunction with the accompanying drawings in which.

Figure 1:
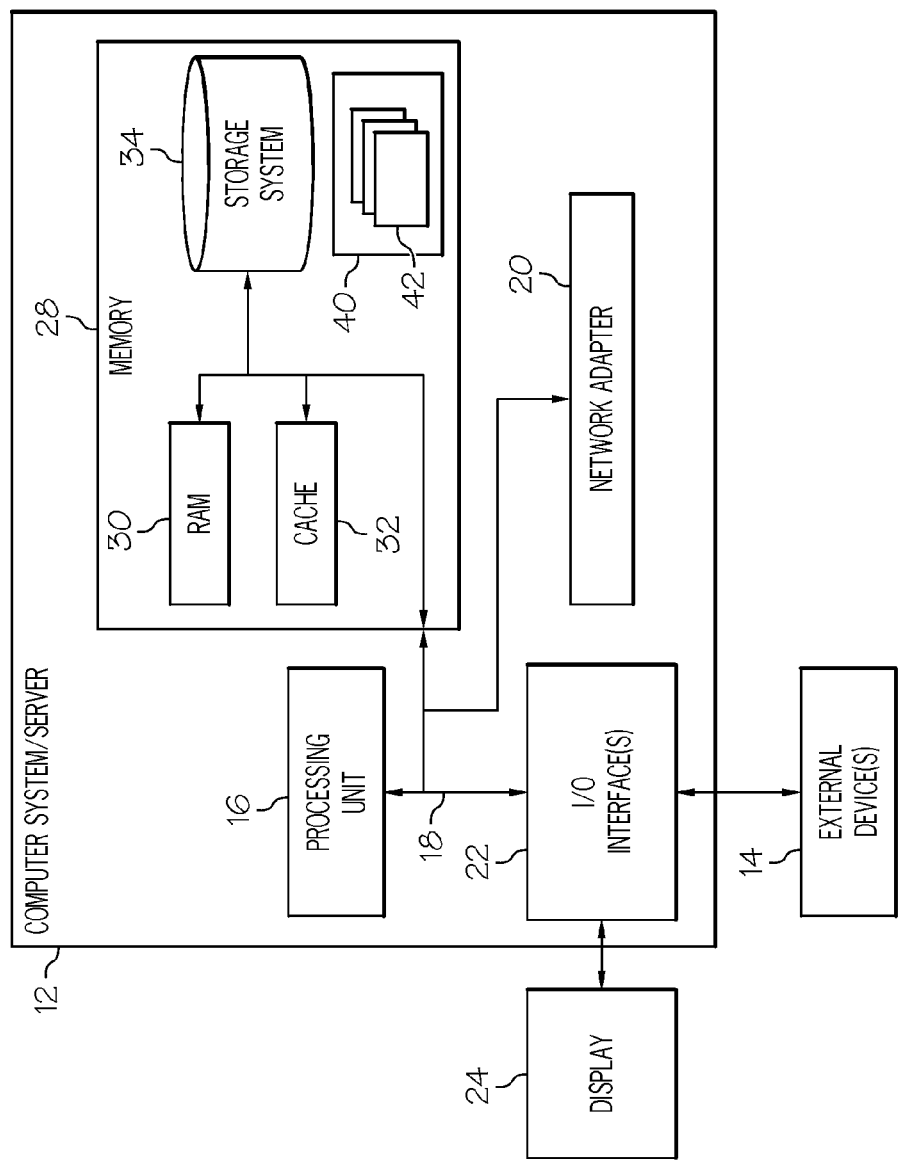
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for provisioning a virtual resource instance (e.g., a server instance, etc.) in a networked computing environment (e.g., a cloud computing environment) based upon network characteristics (e.g., physical locations, email addresses/configurations, network connection types, internet protocol (IP) addresses, etc.) of a set (at least one) of intended end users of the virtual resource instance. Specifically, in a typical embodiment, the network characteristics associated with the set of intended end users will be gathered and analyzed (e.g., to determine end user location, etc.). The analysis of the network characteristics will then be used to calculate/determine relative (e.g., network) efficiency scores for each intended end user for a set of potential data centers for the virtual resource instance. The relative efficiency scores for each potential data center will be summed/totaled to yield a total (e.g., network) efficiency score for each potential data center. Thereafter, the particular data center with the highest/best total efficiency score may be selected, and the requested resource instance may be provisioned at that data center.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
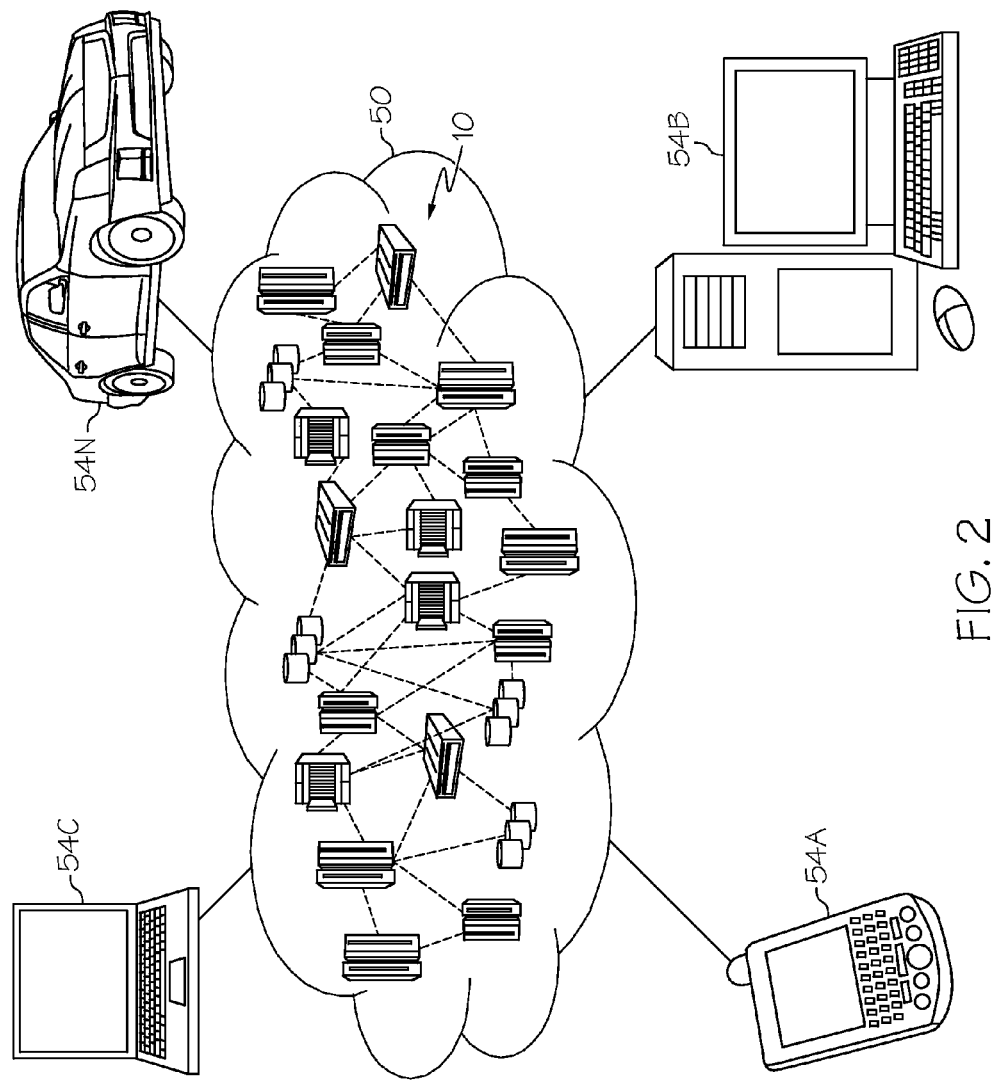
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
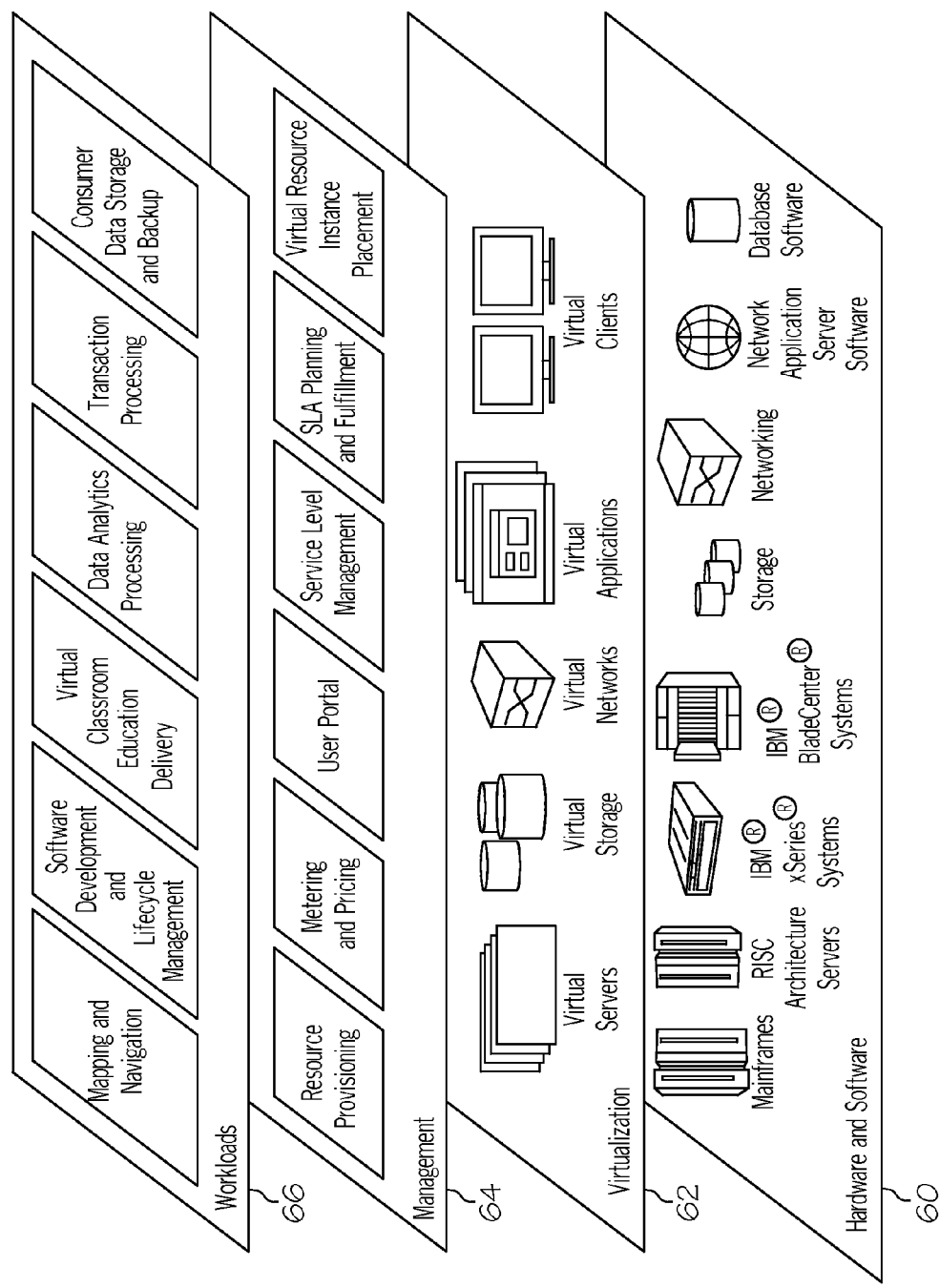
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is virtual resource (e.g., computing resource) instance placement, which represents the functionality that is provided under the embodiments of the present invention. Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the resource instance placement functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed. It is further understood that although the illustrative examples set forth below describe the provisioning of a virtual server instance, instances of any type of virtual resources (e.g., IP addresses, virtual storage drives, master images, etc.) could be provisioned in accordance with the teachings recited herein.

Figure 4:
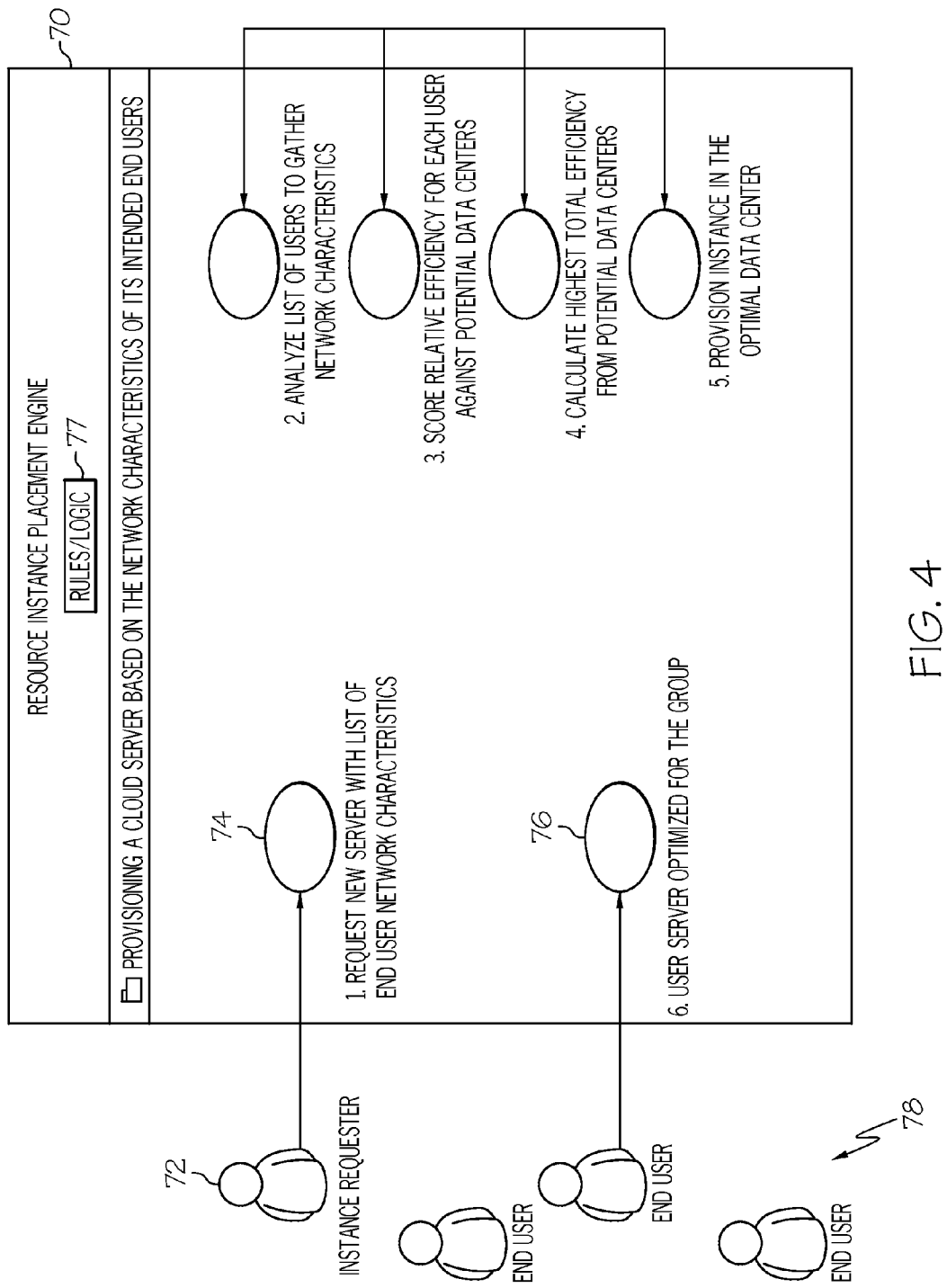
FIG. 4 depicts a system diagram according to an embodiment of the present invention.

Referring now to FIG. 4, a system diagram depicting an illustrative example of one embodiment present invention is shown. As depicted, a virtual resource placement engine (engine 70) is shown. Although not shown in FIG. 4, engine 70 could be positioned within a networked computing environment (e.g., comprising cloud computing environment 50 of FIG. 1). In general, engine 70 can be implemented as program 40 on computer system 12 of FIG. 1 and can implement the functions recited herein as depicted in management layer 64 of FIG. 3. Moreover, engine 70 (in one embodiment) may comprise a rules and/or computational engine that processes a set (at least one) of rules/logic 77 and/or performs a set of computations to determine optimal locations to place instances of virtual (e.g., computing) resources.

Along these lines, system 70 may perform multiple functions similar to a general-purpose computer using rules 77. Specifically, among other functions, engine 70 may: receive a request for a virtual resource instance on a computer memory medium in the networked computing environment, the request being associated with a set of network characteristics for a set of intended end users of the virtual resource instance; analyze the set of network characteristics for each of the set of intended end users; calculate a relative efficiency score for each of the set of intended end users based on the network characteristics and a set of potential data centers in which the virtual resource instance can be provisioned; calculate a total efficiency score for each of the set of potential data centers based on the relative efficiency scores; select a particular data center from the set of potential data centers based on the total efficiency scores; and/or provision the virtual resource instance in the particular data center.

ILLUSTRATIVE EXAMPLES

These concepts will be explained further in conjunction with a set of illustrative examples shown and depicted in FIGS. 4-5. It is understood that although the illustrative examples set forth below describe the provisioning of a virtual server, any type of virtual computing resource could be provisioned in accordance with the teachings recited herein.

Example 1

A team of five developers are located throughout the United States and need access to a virtual server for their day-to-day work. Assume that three virtual servers are located on the East Coast near New York, one virtual server is in Colorado, and one virtual server is in California. When one of these virtual servers is provisioned, the provisioning should take into account the location and network characteristics of the end users (e.g., the five developers), such as their physical location and quality of their Internet connection. In this case, engine 70 may determine the majority of the users that might benefit from locating the new virtual server in a data center in Chicago, Ill., due to its central geographical location.

Example 2

Three international call centers need access to a single virtual server that will contain a customer database for them to reference while answering phone calls. Assume that one call center is in the United Kingdom, Australian, and one is in Canada. When the server is provisioned, it should take into account the location and network characteristics of these call centers, such as their physical location and quality of their Internet connection. In this case, the system sees that there is no clear physical location that would benefit all three call centers over any other location. However, the call centers each have a different quality network connection. For example, assume that country "A" has the fastest link and country "B" has the slowest. Therefore, the system provisions the server in a data center near India, so that while its network connection is slow, at least the proximity is closer and thus the experience for the country "A" call center is roughly equal to the experience for the call center in country "B", which must make longer network connections but has a faster link.

Referring once again to FIG. 4, a process flow is shown by which each of these illustrative examples may be addressed in accordance with the embodiments of the present invention:
1. Instance requester 72 issues a request 74 for a new virtual server with network characteristics for list of intended end users 78.
    A. Characteristics could include: physical location, email address (which has a domain or organizational hint), connection type, and/or IP address.
2. Engine 70 analyzes the list of intended end users 78 to gather network characteristics using one or more of the following approaches:
    A. Engine 70 could use information explicitly provided by the instance requester such as IP addresses, locations, and/or connection types;
    B. Engine 70 could use information implicitly inferred from information provided by the instance requester such as that obtained by parsing email addresses for locational information (e.g., an embedded ISO country code), performing a "trace route" on the email domain name, and/or consulting DNS records on the email domain name; and/or
    C. Engine 70 could also consult its own information sources such as past history of network performance based on the above characteristics, current network trends, traffic, status, etc., and/or future outages or planned upgrades that could affect network quality.
3. Engine 70 calculates a relative efficiency score for each intended user against a set of potential data centers. Specifically, engine 70 may perform one or more of the following functions:
    A. Engine 70 may gather a list of potential data centers which have their own characteristics such as location, capacity, etc.;
    B. For each intended end user, engine 70 may determine an efficiency score for the intended end user to use the server in the proposed data center location (e.g., estimated network latency);
    C. Engine 70 may determine a best/most appropriate location for the individual intended end user based on his or her highest efficiency index; and/or
    D. Engine 70 may save this information for later use in a future provisioning activity.
4. Engine 70 calculates a total efficiency score for each potential data centers for all intended end users 78 by taking one or more of the following steps:
    A. Engine 70 may sum the efficiency core/index for a given data center for all users to determine the highest total efficiency for the users; and/or
    B. Engine 70 can further save this additional information for later use in a future provisioning activity.
5. Engine 70 determines the optimal data center (e.g., by selecting a data center having a highest/best efficiency score and provisions virtual server instance 76 in the optimal data center).
6. The intended end users 78 use virtual server instance 76 as optimally configured.

Figure 5:
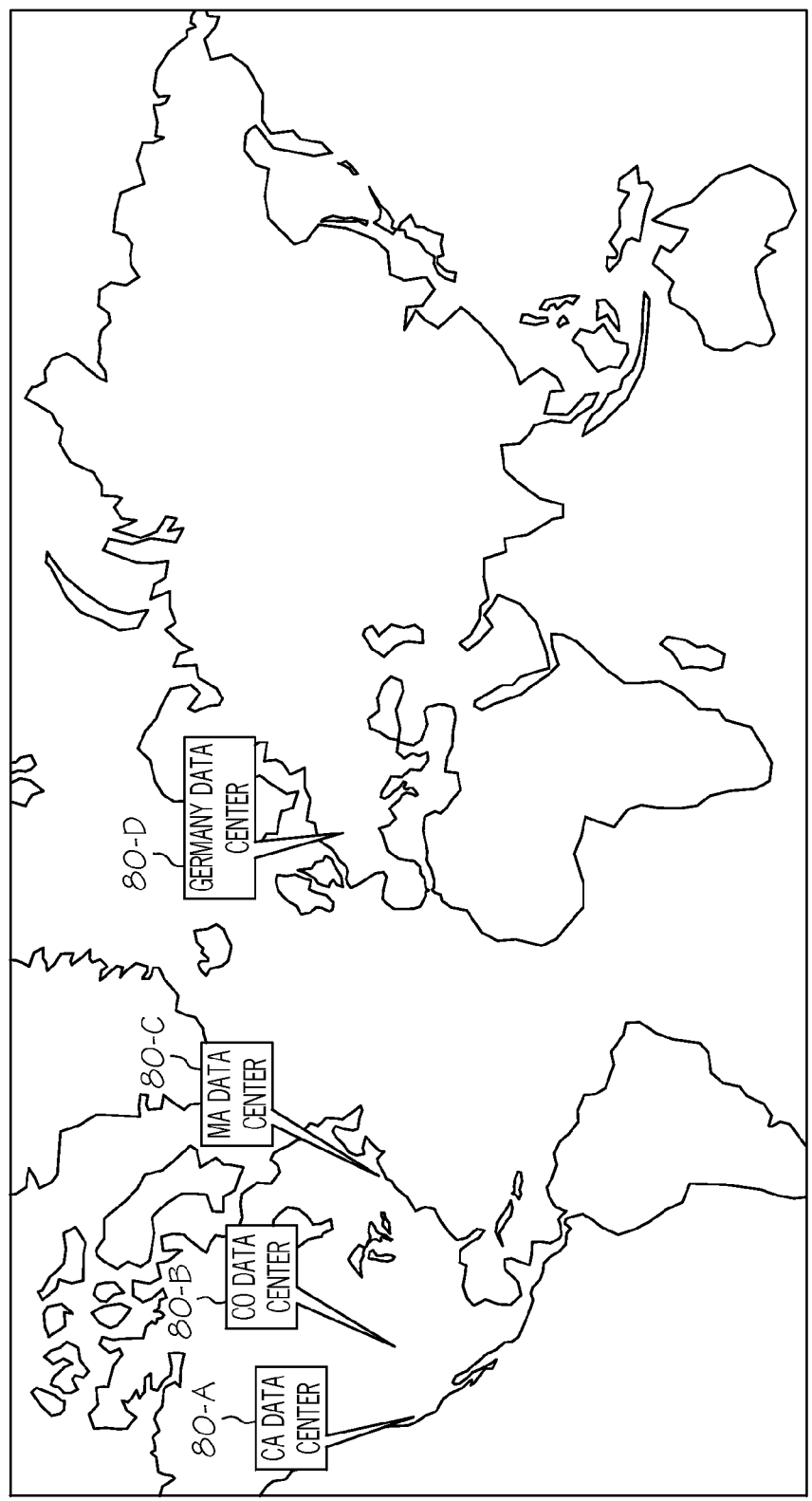
FIG. 5 depicts a global data center map according to an embodiment of the present invention.

Referring to FIG. 5, a global map is shown further illustrating these concepts. In this case, there are 506 end users who will want access to a single virtual server instance that is to be provisioned. (e.g., 500 in the eastern United States, and six in Europe). Further assume that there are four available data centers (e.g., one in California—80A, one in Colorado —80B, one in Massachusetts —80C, and one in Germany —80D). In this example, the one that is closest to the largest amount of users (e.g., 500 of the 506 end users) is the data center in Massachusetts. Thus, engine 70 may select the Massachusetts data center 80C to host the requested virtual server instance.

Shown below is illustrative pseudo code demonstrating one approach for how the teachings recited herein may be implemented. This pseudo code assumes the system/engine 70 is:

1. Configured with data and logic to trace the current path between each end user and each data center based on the information provided by the instance requester.
2. Aware of past network trends between the user and the data center.
3. Aware of future planned outages or trends that will affect the network between the user and the data center.
4. Aware of the average country to country network latency and whether there are any geopolitical issues that could affect the route, such as embargoes/firewalls.

Moreover, it is understood that one end user or a small group of end users may throw the location off for the entire set of users (e.g., a small group of end users may be a statistical outlier having an inordinate impact on the end results). In such a situation, engine 70 may be extended to determine that the subgroup of users be separated from the first group and use a different data center that is more suitable, and therefore more suitable for the larger group.

Illustrative Pseudo Code

The below code can be utilized to implement the embodiments of the invention as set forth in the examples set forth above:

```
$system = new ProvisioningSystem( );
$userResults = array( );
// Fetch scoring data.
foreach ($dataCenters as $dataCenter) {
    foreach ($users as $user) {
        $userResults [$user->id] [$dataCenter->id] ['physicalScore']
= $system->tracePhysicalPath ($user, $dataCenter);
        $userResults [$user->id] [$dataCenter->id] ['historicalScore']
= $system->analyzePastTrends ($user, datacenter);
        $userResults [$user->id] [$dataCenter->id] ['futureScore'] =
$system->analyzeFutureEvents ($user, $dataCenter);
$userResults [$user->id] [$dataCenter->id] ['averageLocationScore']
=$system->getGeneralOrPoliticalCountryToLatency ($user, $dataCenter);
    }
}
//Determine best datacenter for each individual user.
Foreach ($users as $user) {
    $user->bestDatacenterID = -1;
    Foreach ($userResults as $userResults) {
        $currentPainIndex = $userResults [$user->id][$dataCenter-
>id]['physicalScore'] +
                $userResults [$user->id][$dataCenter-
>id]['historicalScore'] +
                $userResults [$user->id][$dataCenter-
>id]['futureScore'] +
                $userResults [$user->id][$dataCenter-
>id]['averageLocationScore'] ;
If ($user->bestDatacenterID == -1 || $currentPainIndex < $user-
>bestDatacenterID) {
    $user->bestDatacenterID = $dataCenter->id;
}
}
}
// Find best datacenter for all users by incrementing it each time it occurs.
$dataCenterScores = array ( );
Foreach ($users as $user) {
    $dataCenterScores [$user->bestDatacenerID] ==;
}
// Return the value with the highest score.
Return max ($dataCenterScore) ;
```

Figure 6:
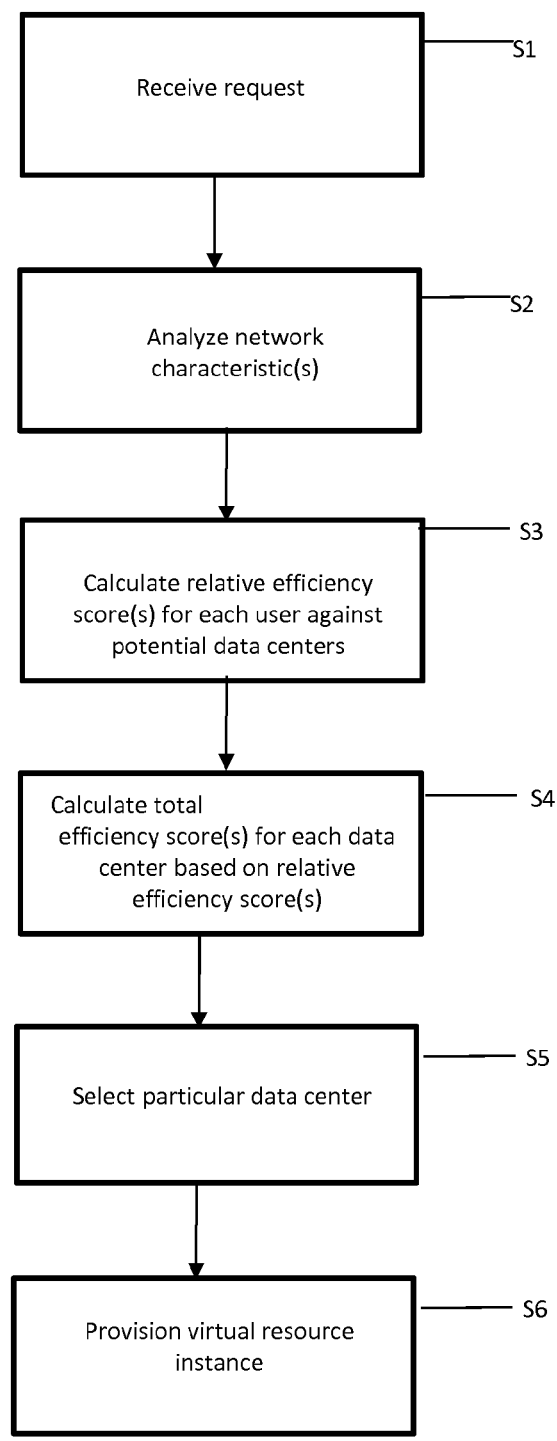
FIG. 6 depicts a method flow diagram according to an embodiment of the present invention.

Referring now to FIG. 6, a method flow diagram according to an embodiment of the present invention is shown. In step S1, a request for a virtual resource instance is received on a computer memory medium in the networked computing environment. As indicated above, the request is typically associated with a set of network characteristics for a set of intended end users of the virtual resource instance. In step S2, the set of network characteristics is analyzed for each of the set of intended end users. In step S3, a relative efficiency score is calculated for each of the set of intended end users based on the network characteristics and a set of potential data centers in which the virtual resource instance can be provisioned. In step S4, a total efficiency score is calculated for each of the set of potential data centers based on the relative efficiency scores. In step S5, a particular data center is selected from the set of potential data centers based on the total efficiency scores. In step S6, the virtual resource instance is provisioned in the particular data center.

While shown and described herein as a virtual computing resource instance placement solution, it is understood that the invention further provides various alternative embodiments. For example, in one embodiment, the invention provides a computer-readable/useable medium that includes computer program code to enable a computer infrastructure to provide virtual computing resource instance placement functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide virtual computing resource instance placement functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for virtual computing resource instance placement. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for determining one or more locations to place virtual resource instances in a networked computing environment, comprising:

receiving a request for a virtual resource instance on a computer memory medium in the networked computing environment, the request being associated with a set of network characteristics for a set of intended end users of the virtual resource instance, the set of intended end users including a first intended end user located at a first physical location and a second intended end user located at a second physical location;

parsing the email addresses of the set of intended users included in the set of network characteristics for information that indicates a physical location of each of the set of intended end users;

analyzing, using at least one computer device, the set of network characteristics for each of the set of intended end users based on the physical location indicated by the parsing of an email address of each of the set of intended end users to get a set of potential data centers having relative proximity to the set of intended end users in which the virtual resource instance can be provisioned;

calculating, using at least one computer device, a relative efficiency score for every intended end user of the set of intended end users and every one of the set of potential data centers, by calculating, for each intended end user, a relative efficiency score that is based on the physical location of the intended end user and reflects an expected latency particular to the end user with respect to each of the set of potential data centers;

calculating, using the at least one computer device, a total efficiency score for each of the set of potential data centers, each total efficiency score being based on a compilation of the relative efficiency scores of all of the set of intended end users that correspond to a particular data center;

selecting a particular data center from the set of potential data centers based on the total efficiency scores; and provisioning the virtual resource instance in the particular data center.

2. The computer-implemented method of claim 1, further comprising associating the virtual resource instance with the set of intended end users.

3. The computer-implemented method of claim 1, the networked computing environment comprising a cloud computing environment.

4. The computer-implemented method of claim 1, the network characteristics comprising at least one of the following: physical locations associated with the set of intended end users, email addresses associated with the set of intended end users, network connection types associated with the set of intended end users, or internet protocol (IP) addresses associated with the set of intended end users.

5. The computer-implemented method of claim 1, the relative efficiency scores being based on network efficiencies, wherein the set of intended end users can utilize the virtual resource instance in each of the set of potential data centers.

6. The computer-implemented method of claim 1, the total efficiency scores being based upon summation of the relative efficiency scores.

7. The computer-implemented method of claim 1, the particular data center being selected based upon a highest total efficiency score.

8. A system for determining one or more locations to place virtual resource instances in a networked computing environment, comprising:

a memory medium comprising instructions;
a bus coupled to the memory medium; and
a processor coupled to the bus that when executing the instructions causes the system to:

receive a request for a virtual resource instance on a computer memory medium in the networked computing environment, the request being associated with a set of network characteristics for a set of intended end users of the virtual resource instance, the set of intended end users including a first intended end user located at a first physical location and a second intended end user located at a second physical location;

parse the email addresses of the set of intended users included in the set of network characteristics for information that indicates a physical location of each of the set of intended end users;

analyze the set of network characteristics for each of the set of intended end users based on the physical location indicated by the parsing of an email address of each of the set of intended end users to get a set of potential data centers having relative proximity to the set of intended end users in which the virtual resource instance can be provisioned;

calculate using the at least one computer device, a relative efficiency score for every intended end user of the set of intended end users and every one of the set of potential data centers, by calculating, for each intended end user, a relative efficiency score that is based on the physical location of the intended end user and reflects an expected latency particular to the end user with respect to each of the set of potential data centers;

calculate a total efficiency score for each of the set of potential data centers, each total efficiency score being based on a compilation of the relative efficiency scores of all of the set of intended end users that correspond to a particular data center;

select a particular data center from the set of potential data centers based on the total efficiency scores; and provision the virtual resource instance in the particular data center.

9. The system of claim 8, the memory medium further comprising instructions for causing the system to associate the virtual resource instance with the set of intended end users.

10. The system of claim 8, the networked computing environment comprising a cloud computing environment.

11. The system of claim 8, the network characteristics comprising at least one of the following: physical locations associated with the set of intended end users, email addresses associated with the set of intended end users, network connection types associated with the set of intended end users, or internet protocol (IP) addresses associated with the set of intended end users.

12. The system of claim 8, the relative efficiency scores being based on network efficiencies, wherein the set of intended end users can utilize the virtual resource instance in each of the set of potential data centers.

13. The system of claim 8, the total efficiency scores being based upon summation of the relative efficiency scores.

14. The system of claim 8, the particular data center being selected based upon a highest total efficiency score.

15. A computer program product for determining one or more locations to place virtual resource instances in a networked computing environment, the computer program product comprising a computer readable storage device, and program instructions stored on the computer readable storage device, to:

receive a request for a virtual resource instance on a computer memory medium in the networked computing environment, the request being associated with a set of network characteristics for a set of intended end users of the virtual resource instance, the set of intended end users including a first intended end user located at a first physical location and a second intended end user located at a second physical location;

parse the email addresses of the set of intended users included in the set of network characteristics for information that indicates a physical location of each of the set of intended end users;

analyze the set of network characteristics for each of the set of intended end users based on the physical location indicated by the parsing of an email address of each of the set of intended end users to get a set of potential data centers having relative proximity to the set of intended end users in which the virtual resource instance can be provisioned;

calculate, using the at least one computer device, a relative efficiency score for every intended end user of the set of intended end users and every one of the set of potential data centers, by calculating, for each intended end user, a relative efficiency score that is based on the physical location of the intended end user and reflects an expected latency particular to the end user with respect to each of the set of potential data centers;

calculate a total efficiency score for each of the set of potential data centers, each total efficiency score being based on a compilation of the relative efficiency scores of all of the set of intended end users that correspond to a particular data center;

select a particular data center from the set of potential data centers based on the total efficiency scores; and provision the virtual resource instance in the particular data center.

16. The computer program product of claim 15, the computer readable storage media further comprising instructions to associate the virtual resource instance with the set of intended end users.

17. The computer program product of claim 15, the networked computing environment comprising a cloud computing environment.

18. The computer program product of claim 15, the network characteristics comprising at least one of the following: physical locations associated with the set of intended end users, email addresses associated with the set of intended end users, network connection types associated with the set of intended end users, or internet protocol (IP) addresses associated with the set of intended end users.

19. The computer program product of claim 15, the relative efficiency scores being based on network efficiencies, wherein the set of intended end users can utilize the virtual resource instance in each of the set of potential data centers.

20. The computer program product of claim 15, the total efficiency scores being based upon summation of the relative efficiency scores.

21. The computer program product of claim 15, the particular data center being selected based upon a highest total efficiency score.

22. A method for deploying a system for determining one or more locations to place virtual resource instances in a networked computing environment, comprising:

providing a computer infrastructure having at least one computer device being operable to:

receive a request for a virtual resource instance on a computer memory medium in the networked computing environment, the request being associated with a set of network characteristics for a set of intended end users of the virtual resource instance, the set of intended end users including a first intended end user located at a first physical location and a second intended end user located at a second physical location;

parse the email addresses of the set of intended users included in the set of network characteristics for information that indicates a physical location of each of the set of intended end users;

analyze the set of network characteristics for each of the set of intended end users based on the physical location indicated by the parsing of an email address of each of the set of intended end users to get a set of potential data centers having relative proximity to the set of intended end users in which the virtual resource instance can be provisioned;

calculate, using the at least one computer device, a relative efficiency score for every intended end user of the set of intended end users and every one of the set of potential data centers, by calculating, for each intended end user, a relative efficiency score that is based on the physical location of the intended end user and reflects an expected latency particular to the end user with respect to each of the set of potential data centers;

calculate a total efficiency score for each of the set of potential data centers, each total efficiency score being based on a compilation of the relative efficiency scores of all of the set of intended end users that correspond to a particular data center;

select a particular data center from the set of potential data centers based on the total efficiency scores; and provision the virtual resource instance in the particular data center.

\* \* \* \* \*